(12) United States Patent
Yoshida

(10) Patent No.: US 6,345,144 B1
(45) Date of Patent: Feb. 5, 2002

(54) APPARATUS AND METHOD FOR RECORDING A DIGITAL IMAGE SIGNAL

(75) Inventor: Yumi Yoshida, Ebina (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/040,302

(22) Filed: Mar. 18, 1998

(30) Foreign Application Priority Data

Mar. 18, 1997 (JP) .............................................. 9-064271

(51) Int. Cl.[7] .............................................. H04N 5/783
(52) U.S. Cl. .......................................... 386/68; 386/81
(58) Field of Search .............................. 386/68, 81–82, 386/6–8, 33, 111–112; H04N 5/76, 5/92, 9/79, 5/783

(56) References Cited

U.S. PATENT DOCUMENTS 6,011,663 A * 1/2000 Inoue et al. ................... 386/68
6,097,877 A * 8/2000 Katayama et al. ............. 386/68
6,141,486 A * 10/2000 Lane et al. ..................... 386/68

FOREIGN PATENT DOCUMENTS

WO      WO 96/13121    *  5/1996    ............ H04N/5/76

* cited by examiner

Primary Examiner—Thai Tran
(74) Attorney, Agent, or Firm—Jacobson Holman, PLLC

(57) ABSTRACT

A digital image signal compressed with orthogonal transform is recorded. Intraframe data is separated from an input digital image signal compressed with orthogonal transform. The separated intraframe data is once stored in a memory. First data for special reproduction is generated by reading the stored intraframe data at a frame interval depending on a reproduction speed and eliminating second data from the intraframe data read from the memory so that an amount of remaining data after the second data is eliminated is within a target code amount. The second data is related to orthogonally transformed block coefficients of the intraframe data read from the memory. Data to be recorded is then generated by combining the first data for special reproduction with the input digital image signal.

18 Claims, 3 Drawing Sheets

|   |   |   |   |   |   |   |   |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 2

|   |   |   |   |   |   |   |   |
|---|---|---|---|---|---|---|---|
| $d_1$ | $d_2$ | $d_6$ | $d_7$ | 0 | 0 | $d_{28}$ | 0 |
| $d_3$ | $d_5$ | 0 | 0 | 0 | 0 | 0 | 0 |
| 0 | 0 | 0 | $d_{18}$ | 0 | 0 | 0 | 0 |
| $d_{10}$ | 0 | 0 | 0 | 0 | $d_{41}$ | 0 | 0 |
| 0 | 0 | 0 | 0 | 0 | 0 | 0 | 0 |
| 0 | $d_{23}$ | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3

APPARATUS AND METHOD FOR RECORDING A DIGITAL IMAGE SIGNAL

BACKGROUND OF THE INVENTION

The present invention relates to digital image recording. Particularly, this invention relates to digital image recording of compressed digital image signals on a storage medium.

Well known video tape recorders record and reproduce image signals compressed and coded by a standard color moving picture compression and coding method such as MPEG on and from a magnetic tape via a rotary head mechanism.

The recorders are capable of recording data for special reproduction such as quick reproduction on specific locations on the magnetic tape under a fixed reproduction speed in special reproduction.

The special reproduction data includes data generated under a high compression ratio with low frequency component extraction. However, signals transmitted by digital TV broadcasting do not include such special reproduction data, thus special reproduction data recording and reproduction being impossible.

SUMMARY OF THE INVENTION

An object of the present invention is to provide an apparatus and a method of digital image signal recording capable of special reproduction of digital image signals with no special reproduction data.

The present invention provides an apparatus for recording a digital image signal, comprising: a separator to separate intraframe data from an input digital image signal compressed with orthogonal transform; a memory to store the separated intraframe data; a first generator to generate first data for special reproduction by reading the stored intraframe data at a frame interval depending on a reproduction speed and eliminating second data from the intraframe data read from the memory so that an amount of remaining data after the second data is eliminated is within a target code amount, the second data being related to orthogonally transformed block coefficients of the intraframe data read from the memory; and a second generator to generate data to be recorded by combining the first data for special reproduction with the input digital image signal.

Further, the present invention provides a method of recording a digital image signal, comprising the steps of: separating intraframe data from an input digital image signal compressed with orthogonal transform; storing the separated intraframe data in a memory; generating first data for special reproduction by reading the stored intraframe data at a first frame interval depending on a reproduction speed and eliminating second data from the intraframe data read from the memory so that an amount of remaining data after the second data is eliminated is within a target code amount, the second data being related to orthogonally transformed block coefficients of the intraframe data read from the memory; and generating data to be recorded by combining the first data for special reproduction with the input digital image signal.

BRIEF DESCRIPTION OF DRAWINGS

FIG. 2 illustrates zigzag scanning of DCT coefficients;

FIG. 3 further illustrates zigzag scanning of DCT coefficients; and

DETAILED DESCRIPTION OF PREFERRED EMBODIMENT

Figure 1:
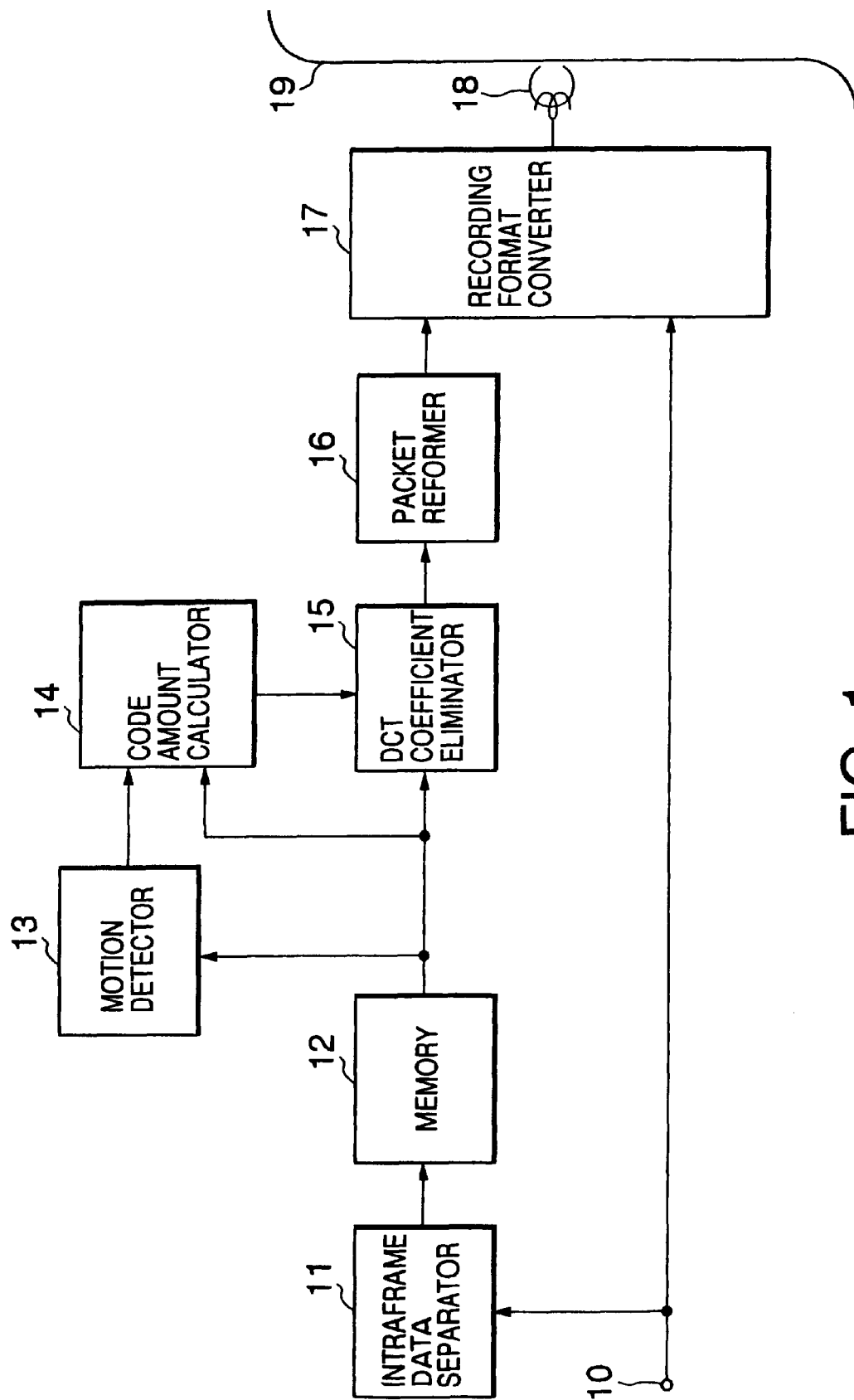
FIG. 1 is a block diagram of a preferred embodiment of a digital image signal recording apparatus according to the present invention.

A preferred embodiment will be described in detail with reference to the attached drawings.

MPEG2 transport stream packets carrying video packets obtained by receiving a digital broadcasting signal compressed by MPEG2 with no special reproduction data are supplied to an intraframe data separator 11 and a recording format converter 17 via an input terminal 10.

The intraframe data separator 11 separates intraframe picture data (I picture data) from the MPEG2 transport stream packets. The separated picture data is once stored in a memory 12 and then supplied to a motion detector 13, a code amount calculator 14. and a DCT coefficient eliminator 15.

The motion detector 13 examines the intraframe data for motion vectors. When the motion vectors are detected, the detector 13 obtains a representative value of the motion vectors per intraframe.

In detail, the representative value of moving vectors is obtained by using a pixel value of a specific location on one intraframe; or an average, the maximum or a middle value of all or a portion of motion vectors on one intraframe.

The motion detector 13 then sets the minimum reproduction order $n_{min}$, according to the representative value MV, to a small one when a picture moves greatly, while to a large one when the picture moves a little bit or the picture is a still picture.

In detail, the motion detector 13 has a look-up table as shown below:

| Vector | $n_{min}$ |
|---|---|
| MV ≦ MV1 | n1 |
| MV1 < MV ≦ MV2 | n2 |
| MV2 < MV ≦ MV3 | n3 |
| MV3 < MV ≦ MV4 | n4 |
| MV4 < MV | n5 | where MV denotes the representative value, MV1 to MV4 predetermined values and n1 to n5 predetermined minimum reproduction order values, and MV1≦MV2≦MV3≦MV4 and n1≧n2≧n3≧n4.

The motion detector 13 compares the representative value MV and the predetermined values MV1 to MV4 per intraframe and select one minimum reproduction order value according to the look-up table.

Therefore, the following relationship is established:

$$n_{minA} \leqq n_{minB} \text{ if } MV_A > MV_B$$

where $MV_A$ and $MV_B$ denote a magnitude of representative values of motion vectors of pictures A and B, respectively, and $f(MV_A)$ and $f(MV_B)$ the minimum reproduction order $n_{minA}$ and $n_{minB}$, respectively.

The minimum reproduction order $n_{min}$ is, however, set on the basis of a reproduction speed when no motion vector is detected.

As described above, the motion detector 13 provides the minimum reproduction order $n_{min}$ for a picture of small movement or a still picture, which is larger than the minimum reproduction order $n_{min}$ for a picture of large movement, thus preventing a picture from deterioration.

On the other hand, the motion detector 13 provides the minimum reproduction order $n_{min}$ for a picture of large movement, which is smaller than the minimum reproduction order $n_{min}$ for a picture of small movement or a still picture, thus achieving a smooth picture movement with relatively narrow frame interval of a picture for special reproduction.

In reproduction of data of a picture that has been DCT (discrete cosine transform)-converted, low-frequency components to be reproduced or high-frequency components to be eliminated are determined on the basis of the minimum reproduction order $n_{min}$.

More in detail, the minimum reproduction order $n_{min}$ is made large for a picture of small movement or a still picture to obtain a clear picture with more high frequency components in one frame than those in continuous frames.

On the other hand, the minimum reproduction order $n_{min}$ is made small for a picture of large movement to obtain a picture of smooth movement (with sacrificing a resolution little bit) with less high frequency components in one frame and more continuous frames.

The code amount calculator 14 determines the order n, an interval for taking out frames (frame interval) and a target code amount C for restricting special reproduction data to a specific amount so that $CF(n) \leq C$ is established where $CF(n)$ denotes a code word of all frames when code words corresponding to coefficients (n+1)th order or higher are eliminated.

The target code amount C is expressed as $$Cg=R \times N/F$$

where Cg denotes data recording capacity (bits) for data per special reproduction intraframe, F a frame rate (frame/second) of input signals, R a recording rate (bit/second) of special reproduction and N an interval N of intraframes to be read for the special reproduction data generation.

The interval N is expressed as $$N=\alpha N_0$$

where $N_0$ denotes an interval of intraframes of input signals and $\alpha$ any integer. A high reproduction speed S provides a large integer $\alpha$, while low S a small $\alpha$ with a result that the higher S, the smaller the special reproduction data frame rate.

The DCT coefficient eliminator 15 reduces a data amount, responsive to a calculation result of the code amount calculator 14, by restricting high-order coefficients corresponding to high frequency components of DCT coefficients in intraframe data when the intraframe data is larger than the target code amount C.

Variable-length codes of the DCT coefficients will be explained. The DCT coefficients are replaced with each other by zigzag scanning in each DCT block as shown in FIG. 2. And, code words are assigned to combinations of zero-run length of zero coefficients and the following levels of nonzero coefficients.

For DCT coefficients as shown in FIG. 3, the combinations are as follows and one code word is assigned to one combination (run, level): $(0, d_2), (0, d_3), (1, d_5), (0, d_6), (0, d_7), (2, d_{10}), (7, d_{18}), (4, d_{23}), (4, d_{28})$ and $(12, d_{41})$.

The DCT value ($d_1$) is coded differently. And, the last nonzero coefficient ($d_{41}$ in FIG. 3) is followed by an EOB (end of block) code.

Explained next is elimination of (n+1)th order or higher code words by the DCT coefficient eliminator 15.

When the nth coefficient $d_n$ is nonzero, eliminated are code words from a code word following to a code word corresponding to (run, level)=$(x, d_n)$ to a code word just before the EOB code.

On the other hand, two methods are employed when the nth coefficient $d_n$ is zero. One is to eliminate code words corresponding to the next coefficient $d_m$ (n<M). More in detail, code words from a code word corresponding to (run, level)=$(x, d_m)$ to a code word just before the EOB code are eliminated. The other is to eliminate code words from a code word following to a code word corresponding to (run, level)=$(x, d_m)$ to a code word just before the EOB code, but, not the code word corresponding to (run, level)=$(x, d_m)$.

In these methods, the nth code word is detected as the code word of the number n by zigzag scanning in the DCT blocks shown in FIG. 2. On the other hand, the code word of the number n is detected as the nonzero code word of the number n by zigzag scanning in the DCT blocks shown in FIG. 3.

The number n is decided by the two methods to eliminate or not the code word corresponding to the nonzero coefficient $d_m$ so that the code amount CF(n) of all frames with elimination of a code word corresponding to the coefficient of the (n+1)th order or higher is less than the target code amount C.

However, an extremely small number of n would cause deterioration of images. In order to avoid this, the minimum value $n_{min}$ is previously set, intraframe data to be taken out next is skipped if $C<CF(n_{min})$ and a code amount corresponding to the skipped data is added to the target code amount C to set a new target code amount (C+Cg). This operation will be repeated until $CF(n_{min}) \leq C$ is established.

Therefore, the intraframe data to be taken out next will at least not be recorded as the special reproduction data if $C<CF(n_{min})$. The value $n_{min}$ depends on a reproduction speed, image movement, a required image quality, etc. Accordingly, code words corresponding to the coefficients of $(n_{min}+1)$th order or higher are eliminated and the low order coefficient data are taken out from each DCT block as the special reproduction data.

As for the value n, the value $n_{min}$ itself is used as the value n or it is decided so as to satisfy the relationship $C<CF(n+1)$.

Instead of the code words corresponding to the coefficients of $(n_{min}+1)$th order or higher, a code word from a code word of the number (n+1) to a code word just before an EOB code can be eliminated.

Input signals to the apparatus shown in FIG. 1 composed by an intraslice method in which a picture is refreshed in each slice in an intra mode are subjected to the same operation as above where an intraframe data consists of sequential intraslice data from an intraslice data of the uppermost portion of a picture to an intraslice data of the lowermost portion of a next picture.

The DCT coefficient eliminator 15 outputs the remaining code words after the elimination described above as the special reproduction data in the MPEG video streams. The special reproduction data does not include interframe predictive image data such as predictive coded and bidirectionally coded pictures.

The MPEG video streams with the special reproduction data are supplied to a packet reformer 16 and reformed into MPEG2 transport stream packets. The reformed packets and the MPEG2 transport stream packets input via the terminal 10 are supplied to a recording format converter 17. The format of the packets are converted into a specific recording format and recorded on a magnetic tape 19 with a rotary head mechanism 18.

As described above, the special reproduction data is generated from the MPEG-compressed digital data that originally does not include the special reproduction data and recorded on specific locations of the magnetic tape 19.

Data recording on the magnetic tape 19 with the rotary head mechanism 18 is done by a helical scanning method. More in detail, the rotary head mechanism 18 is provided with two rotary heads having different azimuth angles. And, the rotary heads are provided so as to face each other with respect to a rotating surface of the rotary head mechanism 18. The rotary heads alternatively record the digital data on the magnetic tape 19 which is travelling and being wound around a rotary body (not shown) obliquely in the range of about −90° to +90°.

The azimuth angles are specific angles provided opposite in a head's track width direction, one being a plus azimuth and the other a minus azimuth.

The rotary head mechanism can be constructed as having two head pairs or more each with two heads having plus and minus azimuths.

Figure 4:
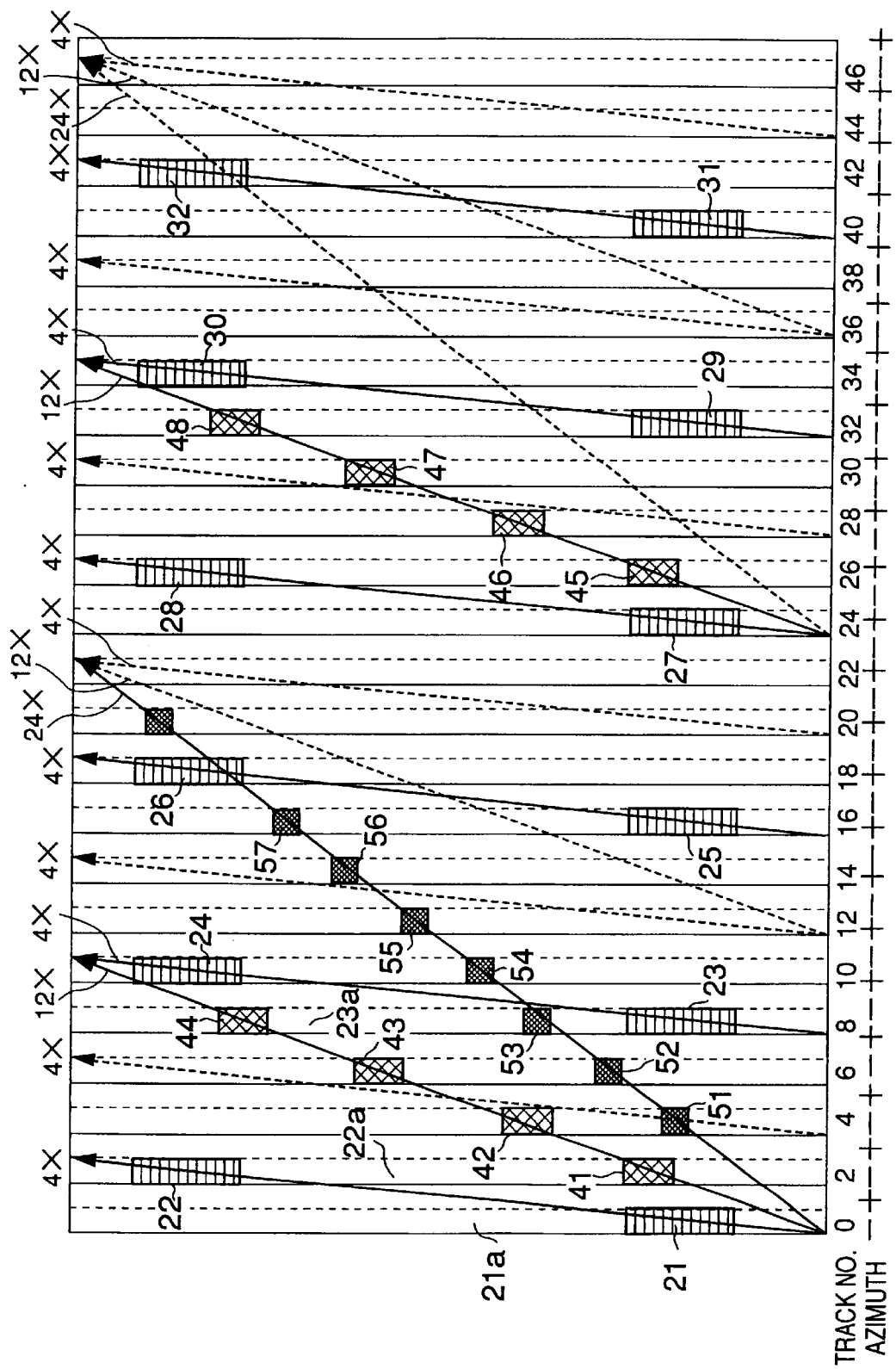
FIG. 4 illustrates scanning passages of magnetic heads in quick reproduction along track patterns on a magnetic tape.

As shown in FIG. 4, the digital data is recorded on each of trucks No. 0 to 48 (49 trucks) per data block of a specific recording format.

Data 21 to 32 for special reproduction four times faster (×4) than normal reproduction have been recorded with data for normal reproduction on the trucks No. 0, 2, 8, 10, 16, 18, 24, 26, 32, 34, 40 and 42, respectively. For example, the data 21 (×4) for special reproduction and data 21a for normal reproduction have been recorded on the truck No. 0.

Further, data 41 to 48 for special reproduction twelfth times faster (×12) than normal reproduction have been recorded with data for normal reproduction and other data on the trucks No. 2, 4, 6, 8, 26, 28, 30 and 32, respectively. For example, the data 22 (×4) and 41 (×12) for special reproduction and data 22a for normal reproduction have been recorded on the truck No. 2.

Furthermore, data 51 to 58 for special reproduction twenty-four times faster (×24) than normal reproduction have been recorded with data for normal reproduction and other data on the trucks No. 4, 6, 8, 10, 12, 14, 16 and 18, respectively. For example, the data 23 (×4), 44 (×12) and 53 (×24) for special reproduction and data 23a for normal reproduction have been recorded on the truck No. 8.

The rotary heads scan the magnetic tape in a direction denoted by an arrow 4× in case of the special reproduction four times faster than the normal reproduction to sequentially reproduce the data 21 to 32.

Further, the rotary heads scan the magnetic tape in a direction denoted by an arrow 12× in case of the special reproduction twelfth times faster than the normal reproduction to sequentially reproduce the data 41 to 48.

Furthermore, the rotary heads scan the magnetic tape in a direction denoted by an arrow 24× in case of the special reproduction twenty-fourth times faster than the normal reproduction to sequentially reproduce the data 51 to 58.

The arrows denoted by solid and dot lines represent scanning directions of rotary heads with minus and plus azimuths, respectively.

The digital image signal recording apparatus according to the present invention can record data produced as described above not only on the magnetic tape but also a disk-like storage medium such as an optical disk and magnetic disk.

Further, the recording apparatus according to the present invention can accept not only data that have been orthogonally transformed by DCT but other methods such as discrete Fourier transform by replacing the DCT coefficient eliminator 15 in FIG. 1 with another eliminator capable of processing data orthogonally transformed by discrete Fourier transform.

As described above, according to the present invention, special reproduction data can be produced and recorded on a storage medium from digital broadcasting signals without special reproduction data originally by eliminating code words from a code word corresponding to coefficients of (n+1)th order or higher or a code word of a number of (n+1) or higher to a code word just before the EOB code.

Further, according to the present invention, the value $n_{min}$ for a picture of small movement or a still picture is set larger than that for a picture of large movement, thus achieving preventing image quality deterioration of a picture of small movement or a still picture while smooth movement reproduction of a picture of large movement with relatively narrow frame period for special reproduction.

Furthermore, according to the present invention, intraframe rate can be selectively varied, thus achieving obtaining orthogonal transform coefficient data of predetermined order ($n_{min}$) or higher.

What is claimed is:

1. An apparatus for recording a digital image signal, comprising:
   a separator to separate intraframe data from an input digital image signal compressed with orthogonal transform;
   a memory to store the separated intraframe data;
   a first generator to generate first data for special reproduction by reading the stored intraframe data at a first frame interval depending on a reproduction speed and eliminating second data from the intraframe data read from the memory so that an amount of remaining data after the second data is eliminated is within a target code amount, the second data being related to orthogonally transformed block coefficients of the intraframe data read from the memory, the first generator having a code amount calculator to detect a frame rate of the separated intraframe data, thus calculating the target code amount to satisfy a recording capacity per frame of the first data for special reproduction under a relationship R×N/F where F denotes the frame rate per second, R a recording rate (bit/second) of the first data for special reproduction and N the first frame interval of the intraframe data read from the memory for generating the first data for special reproduction; and
   a second generator to generate data to be recorded by combining the first data for special reproduction with the input digital image signal.

2. The apparatus according to claim 1, wherein if a relationship C<CF ($n_{min}$) is established, a first intraframe data read from the memory next to a second intraframe data read from the memory for generating the first data for special reproduction is not recorded as the first data for special reproduction, where C denotes the target data, $n_{min}$ a predetermined minimum value and CF(n) a total data amount of the intraframe data after the second is eliminated.

3. The apparatus according to claim 2, wherein the minimum value $n_{min}$ depends on the reproduction speed.

4. The apparatus according to claim 2, wherein the first generator comprises a motion detector to detect motion vectors in the intraframe data read from the memory, the minimum value $n_{min}$ depending on a representative value of the motion vectors and the reproduction speed, while the minimum value $n_{min}$ depending on the reproduction speed if no motion vector is detected.

5. The apparatus according to claim 4, wherein the representative value is obtained by using a pixel value of a specific location on one intraframe of the intraframe data read from the memory; or an average, the maximum or a middle value of all or a portion of motion vectors on the one intraframe.

6. The apparatus according to claim 2, wherein if a relationship $C \geq CF(n_{min})$ is established, the first generator decides n so as to establish another relationship $CF(n) \leq C < CF(n+1)$ and generates remaining data as the first data for special reproduction after the second data is eliminated where C denotes the target data amount, $n_{min}$ a predetermined minimum value and CF(n) a total data amount of the intraframe data after code words are eliminated as the second data, the code words ranging from a code word corresponding to an orthogonally transformed block coefficient of (n+1)th order or more to another code word just before an end of block code in the orthogonally transformed block coefficients.

7. The apparatus according to claim 2, wherein if a relationship $C \geq CF(n_{min})$ is established, the first generator decides n so as to establish another relationship $CF(n) \leq C < CF(n+1)$ and generates remaining data as the first data for special reproduction after the second data is eliminated where C denotes the target data amount, $n_{min}$ a predetermined minimum value and CF(n) a total data amount of the intraframe data after code words are eliminated as the second data from variable-length code words corresponding to the orthogonally transformed block coefficients, the code words to be eliminated ranging from a code word of a (n+1) number or more to another code word just before an end of block code in the orthogonally transformed block coefficients.

8. A method of recording a digital image signal, comprising the steps of:
  separating intraframe data from an input digital image signal compressed with orthogonal transform;
  storing the separated intraframe data in a memory;
  detecting a frame rate of the separated intraframe data;
  calculating a target code amount to satisfy a recording capacity per frame of first data to be generated for special reproduction under a relationship R×N/F where F denotes the frame rate per second, R a recording rate (bit/second) of the first data for special reproduction and N a first frame interval of the intraframe data read from the memory;
  generating the first date for special reproduction by reading the stored intraframe data at the first frame interval depending on a reproduction speed and eliminating second data from the intraframe data read from the memory so that an amount of remaining data after the second data is eliminated is within the target code amount, the second data being related to orthogonally transformed block coefficients of the intraframe data read from the memory; and
  generating data to be recorded by combining the first data for special reproduction with the input digital image signal.

9. The method according to claim 8, wherein if a relationship $C > CF(n_{min})$ is established, a first intraframe data read from the memory next to a second intraframe data read from the memory for generating the first data for special reproduction is not recorded as the first data for special reproduction, where C denotes the target data amount, $n_{min}$ a predetermined minimum value and CF(n) a total data amount of the intraframe data after the second data is eliminated.

10. The method according to claim 9, wherein the minimum value $n_{min}$ depends on the reproduction speed.

11. The method according to claim 9, wherein the first data generating step comprises the step of detecting motion vectors in the intraframe data read from the memory, the minimum value $n_{min}$ depending on a representative value of the motion vectors and the reproduction speed, while the minimum value $n_{min}$ depending on the reproduction speed if no motion vector is detected.

12. The method according to claim 11, further comprising the step of obtaining the representative value by using a pixel value of a specific location on one intraframe of the intraframe data read from the memory; or an average, the maximum or a middle value of all or a portion of motion vectors on the one intraframe.

13. The method according to claim 9, wherein if a relationship $C \geq CF(n_{min})$ is established, the first data generating step comprises the step of deciding n so as to establish another relationship $CF(n) \leq C < CF(n+1)$ and generates remaining data as the first data for special reproduction after the second data is eliminated where C denotes the target data amount, $n_{min}$ a predetermined minimum value and CF(n) a total data amount of the intraframe data after code words are eliminated as the second data, the code words ranging from a code word corresponding to an orthogonally transformed block coefficient of (n+1)th order or more to another code word Just before an end of block code in the orthogonally transformed block coefficients.

14. The method according to claim 9, wherein if a relationship $C \geq CF(n_{min})$ is established, the first data generating step comprises the steps of:
  deciding n so as to establish another relationship $CF(n) \leq C < CF(n+1)$; and
  generating remaining data as the first data for special reproduction after the second data is eliminated where C denotes the target data amount, $n_{min}$ a predetermined minimum value and CF(n) a total data amount of the intraframe data after code words are eliminated as the second data from variable-length code words corresponding to the orthogonally transformed block coefficients, the code words to be eliminated ranging from a code word of a (n+1) number or more to another code word just before an end of block code in the orthogonally transformed block coefficients.

15. An apparatus for recording a digital image signal, comprising:
  a separator to separate intraframe data from an input digital image signal compressed with orthogonal transform;
  a memory to store the separated intraframe data;
  a first generator to generate first data for special reproduction by reading the stored intraframe data at a first frame interval depending on a reproduction speed and eliminating second data from the intraframe data read from the memory so that an amount of remaining data after the second data is eliminated is within a target code amount set per frame, the second data being related to orthogonally transformed block coefficients of the intraframe data read from the memory, the first generator having an eliminator to eliminate, as the second data, code words ranging from a code word corresponding to an orthogonally transformed block coefficient of (n+1)th order or more to another code word just before an end of block code in the orthogonally transformed block coefficients, (n+1) being shared by all orthogonally transformed blocks in a frame; and
  a second generator to generate data to be recorded by combining the first data for special reproduction with the input digital image signal.

16. The apparatus according to claim 15, wherein if a relationship $C \geq CF(n_{min})$ is established, the first generator generates remaining data as the first data for special reproduction after the code words are eliminated where C denotes the target data amount, CF(n) a total data amount of the intraframe data after the code words are eliminated and $n_{min}$ a predetermined minimum value.

17. A method of recording a digital image signal, comprising the steps of:

separating intraframe data from an input digital image signal compressed with orthogonal transform;

storing the separated intraframe data in a memory;

generating a first data for special reproduction by reading the stored intraframe data at a first frame interval depending on a reproduction speed;

eliminating code words as second data from the intraframe data read from the memory, the code words ranging from a code word corresponding to an orthogonally transformed block coefficient of (n+1)th order or more to another code word just before an end of block code in the orthogonally transformed block coefficients, so that an amount of remaining data after the second data is eliminated is within a target code amount set per frame, the second data being related to orthogonally transformed block coefficients of the intraframe data read from the memory, (n+1) being shared by all orthogonally transformed blocks in a frame; and generating data to be recorded by combining the first data for special reproduction with the input digital image signal.

18. The method according to claim 17, wherein if a relationship $C \geq CF(n_{min})$ is established, the first data generating step comprises the step of generating remaining data as the first data for special reproduction after the code words are eliminated where C denotes the target data amount, CF(n) a total data amount of the intraframe data after the code words are eliminated and $n_{min}$ a predetermined minimum value.

* * * * *